(12) United States Patent
Hsu et al.

(10) Patent No.: US 7,713,654 B2
(45) Date of Patent: May 11, 2010

(54) FIXING STRUCTURE OF BATTERY MODULE

(75) Inventors: Cheng-Chung Hsu, Taipei (TW); Chin-Cheng Lee, Taipei (TW)

(73) Assignee: Inventec Corporation, Taipei (TW)

( * ) Notice: Subject to any disclaimer, the term of this patent is extended or adjusted under 35 U.S.C. 154(b) by 1077 days.

(21) Appl. No.: 11/395,957

(22) Filed: Mar. 30, 2006

(65) Prior Publication Data

US 2007/0128506 A1 Jun. 7, 2007

(30) Foreign Application Priority Data

Dec. 1, 2005 (TW) .............................. 94220874 U

(51) Int. Cl.
*H01M 2/10* (2006.01)
*H01M 2/08* (2006.01)
*H01M 2/04* (2006.01)

(52) U.S. Cl. .......................... 429/97; 429/96; 429/163; 429/175; 429/176

(58) Field of Classification Search .................. 429/96, 429/163, 97, 175, 176
See application file for complete search history.

(56) References Cited

U.S. PATENT DOCUMENTS 6,045,936 A * 4/2000 Fischl .......................... 429/48
6,117,575 A * 9/2000 Dinsdale ........................ 429/1

* cited by examiner

*Primary Examiner*—Patrick Ryan
*Assistant Examiner*—Julian Mercado
(74) *Attorney, Agent, or Firm*—Peter F. Corless; Steven M. Jensen; Edwards Angell Palmer & Dodge LLP

(57) ABSTRACT

A fixing structure of battery module for fixing a battery module in an electronic device is proposed. The fixing structure includes a first lid and a second lid, which are formed on a surface of the electronic device, wherein the first lid is formed with a first fastening part, and the second lid is formed with a second fastening part for being engaged with the first fastening part; a mounting cavity formed in the electronic device at a position corresponding to the second lid; a first locking part formed on the second lid; and a second locking part formed on the battery module, for being coupled to the first locking part so as to fasten the battery module to the second lid. When the first and second lids are coupled together by the first and second fastening parts, the battery module fastened to the second lid is received in the mounting cavity and fixed in the electronic device.

9 Claims, 4 Drawing Sheets

FIXING STRUCTURE OF BATTERY MODULE

FIELD OF THE INVENTION

The present invention relates to a fixed technology, and more particularly, to a fixing structure for solidifying battery module in an electronic device thereof.

BACKGROUND OF THE INVENTION

With the development of information technology, various electronic devices have been widely used by people of different age. Simultaneously, with the growing demand of processing large amount of information and improving the operation efficiency, current electronic devices are facing the problem of supply efficiency of power. Besides having power saving device in the electronic device itself, the most popular solution to this problem is to have a backup portable battery. For example, some electronic devices, such as desktop, laptop and server, have cache memory in their motherboard for storing information temporarily when the electronic device is turned on where the cache memory is empowered from the power supplier. However, information stored in cache memory will be lost when the electronic device is turned off because power supplier is unable to supply power. In order to retain information, usually a battery module of cache memory in installed in electronic devices.

However, the battery module in most electronic devices is fixed in the semiconductor device. As shown in FIG. 1, the battery module 10 is fixed on a frame 2, similar to the size of the battery module 10, coupled to the inner part of an electronic device such as a server. This type of fixing structure in the prior art adopts a screw lock method to fasten the screw bolt 21 of the frame 2 and bolting hole 101 on the battery module 10 together with a screw 9.

Although the method to fasten the battery module 10 to the frame 2 by a screw 9 is quite effective, many auxiliary tools, such as a screwdriver, must be inserted into the narrow interior space of server and some important components in server may easily become damaged by these tools. Moreover, not all servers have enough room for operation, which may lead to a waste of time and increase in complication for screwing. Moreover, if the screw drops in the inner part of the server, there is a risk of regional electrical interruption. Therefore, not only the use of auxiliary tools is required to assemble and dissemble the battery module, it also brings inconvenience to the user.

In addition, when dissembling the screws to take out the battery module from the substrate, it easy that the user may drop or lost the screw accidentally. Therefore, the process of dissembling and assembling in this prior art is time consuming and also it is disadvantageous that the cost of purchasing additional screws is increased. Alternatively, in most servers, as the battery module is mounted together with other major components such as a motherboard, it is inconvenient that every time if the battery module is to be replaced or fixed, the user must open the lid of the electronic device.

Hence, there is an urgent need for solving the prior art problem for assembling and dissembling the battery module in a shorter time and easier way.

SUMMARY OF THE INVENTION

In accordance with the above-mentioned drawbacks, the primary objective of the present invention is to provide a fixing structure of a battery module, so as to install a battery module in an electronic device without the need of using tools.

Another objective of the present invention is to provide a fixing structure of a battery module, wherein the battery module can be installed and uninstalled quickly and easily in an electronic device.

A further objective of the present invention is to provide a fixing structure of battery module, to avoid problems of drop and lost of screws, time consuming of the process of assembling and dissembling, damages of electronic components due to improper touch of the electronic components in the electronic device, and increased cost of purchasing screws.

In order to achieve the foregoing and other objectives, this invention discloses a fixing structure of a battery module, for fixing the battery module in an electronic device. The electronic device has a first and a second lid on the surface of the electronic device. The fixing structure comprises a first lid and a second lid, which are formed on a surface of the electronic device, wherein the first lid is formed with a first fastening part, and the second lid is formed with a second fastening part for being engaged with the first fastening part so as to couple the second lid to the first lid; a mounting cavity formed in the electronic device at a position corresponding to the second lid; a first locking part formed on the second lid; and a second locking part formed on the battery module, for being coupled to the first locking part so as to fasten the battery module to the second lid, such that with the first and second lids being coupled together by the first and second fastening parts, the mounting cavity is covered by the second lid, and the battery module fastened to the second lid is received in the mounting cavity and fixed in the electronic device.

Preferably, the second lid is at one side of the battery mounting cavity, which is relatively far away from the first fastening part. This first fastening part is a slot formed on the first lid for covering one side of the electronic device while the second fastening part is a bullet flip to fasten with the corresponding slot.

The first locking part can be a pillar while the second locking part mounted on this battery module is a two connected openings, comprising a first opening formed on the first locking part and a second opening, which is connected with the first opening for fixing the first locking part.

The electronic device can be selected from a group of electronic devices comprising server, desktop, laptop and portable electronic product. When this fixing structure of battery module is used in some electronic devices, such as server, has a third locking part for fastening the first locking part. The second fastening part can be designed to be the same type of the third fastening part so that they can be fastened with the first fastening part.

Comparing with the complication using screws to fix the battery module, the fixing structure of battery module proposed by the present invention can fix the battery module in the electronic device without the need of using tools, allowing assembling and disassembling of battery module in an electronic device to be easier and quicker compared to the prior art. It also prevents loss of screws in the process of fixing screw due to the limitation of space, waste of time, damages of electronic components due to improperly touching of electronic components in the electronic device and an increase of cost of purchasing screws.

Moreover, the conventional way of mounting the battery module with other major electronic components, such as motherboard, in the same space makes interior space of server become crowded. The fixing structure provided by this invention solves this problem by fixing the battery module in the area covering by the second lid and since the area covered by the second lid does not belong to the first lid (top lid of the server), the crowdedness of the inner space of the server can be prevented.

When this fixing structure provided by this invention is applied in the server, it is only required to close the second lid and fasten the first lid (server top lid) with the second lid to fix the battery module, and on the other hand, it only required to open the lid to take out the battery module.

In summary, the fixing structure of the battery module provided by the present speeds up the process of assembling and dissembling of battery module without the need of using tools, as well as reducing the cost, thereby having high value in industry.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
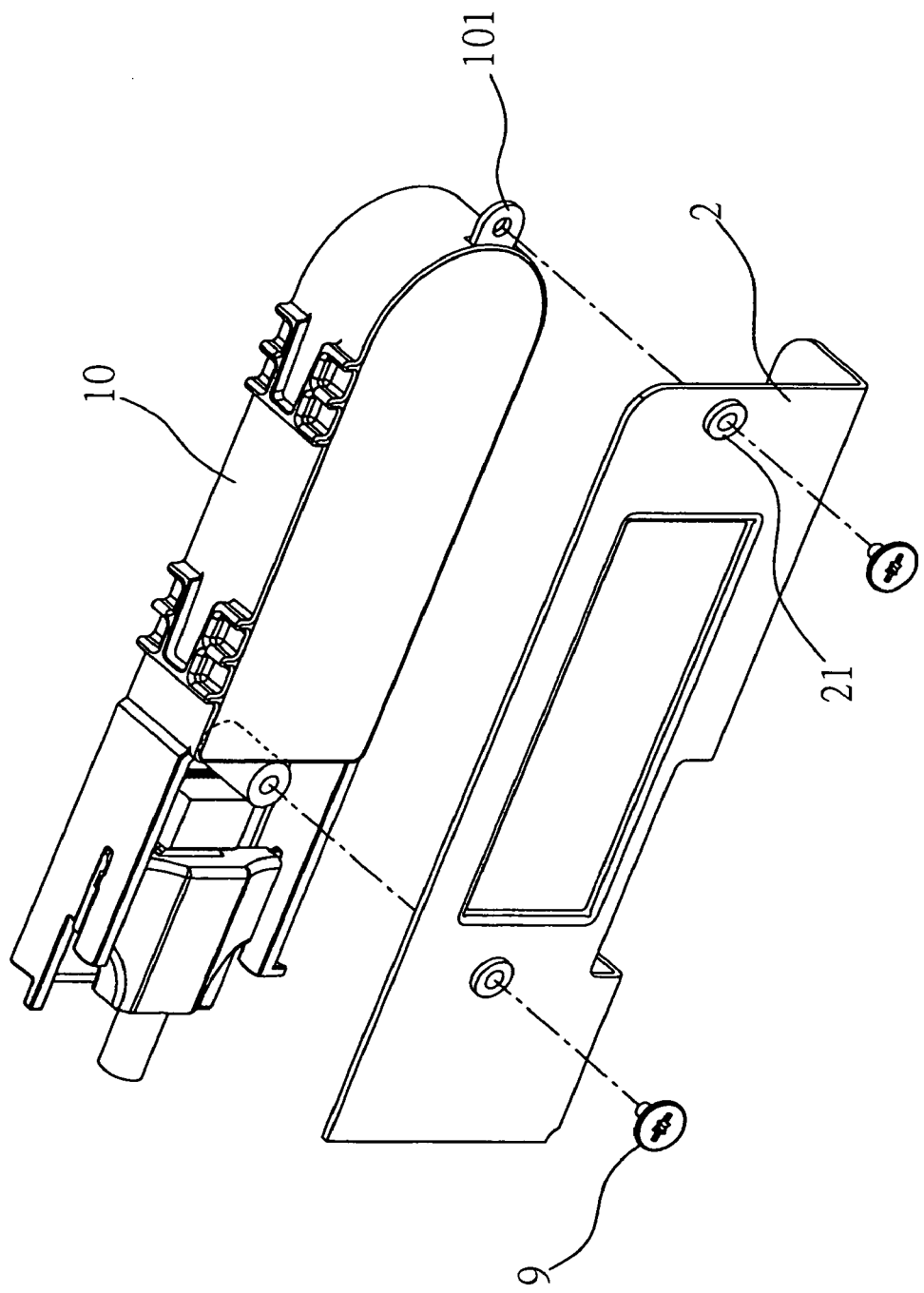
FIG. 1 (PRIOR ART) is a schematic view of a conventional battery module fixing structure.

The present invention is described in the following with specific embodiments, so that one skilled in the pertinent art can easily understand other advantages and effects of the present invention from the disclosure of the invention. The present invention may also be implemented and applied according to other embodiments, and the details may be modified based on different views and applications without departing from the spirit of the invention. In addition, the drawing and the components shown herein are not to scale and are made in simplicity with provision of only associated components related to the invention; in practical usage, the component should be more complexly structured and the number, size, shape and arrangement of each component can be varied accordingly.

Figure 2:
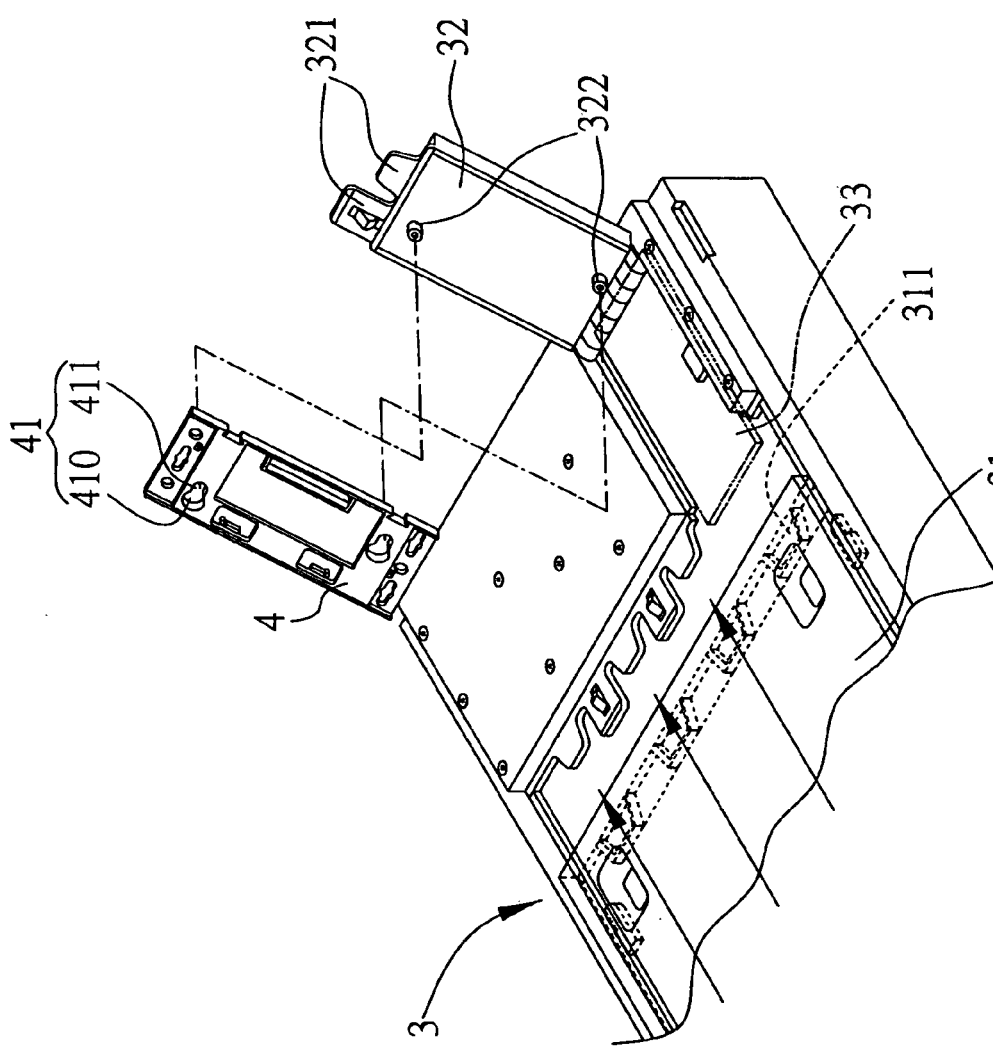
FIG. 2 is a schematic view showing a fixing structure of a battery module in accordance with the first preferred embodiment of the present invention.
Figure 3:
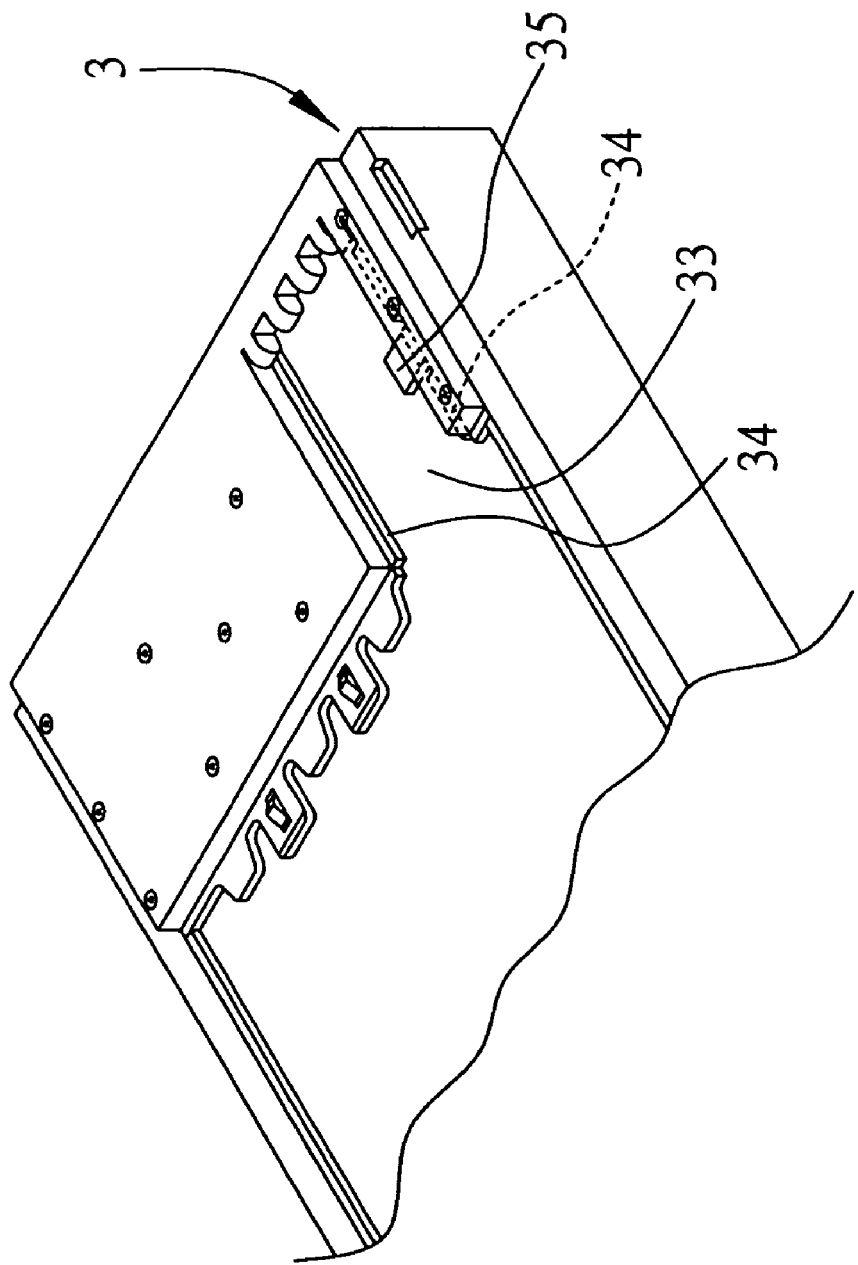
FIG. 3 is an oblique view showing a partial fixing structure of a battery module in accordance with the present invention.
Figure 4:
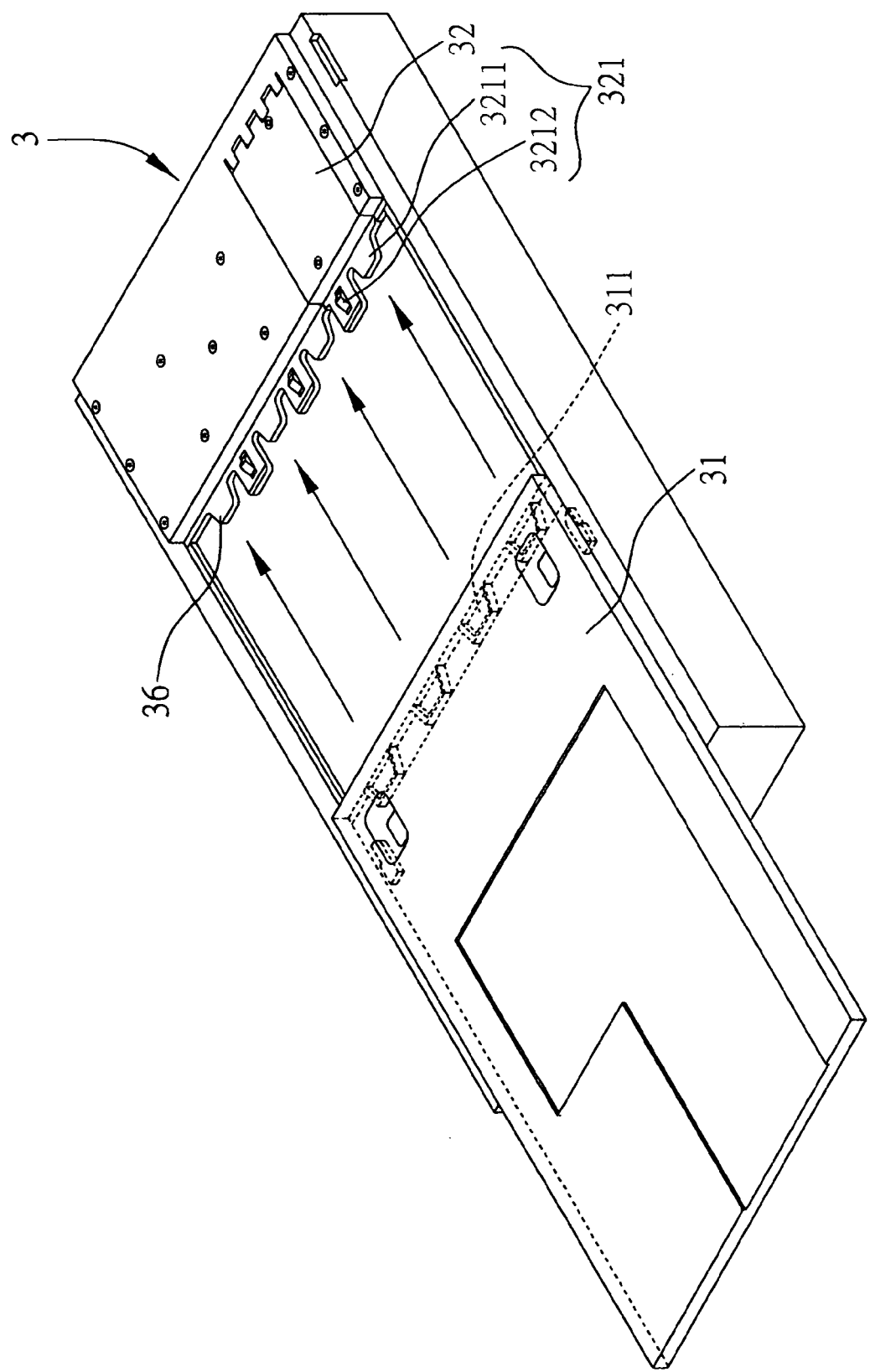
FIG. 4 is an oblique view of a fixing structure of a battery module in accordance with the present invention wherein the fastening structures are illustrated in more details.

Referring to FIGS. 2 to 4, a fixing structure of a battery module of the present invention module in the preferred embodiment is provided. It should be noted that the battery module in the following embodiments can be applied in desktop, laptop, portable electronic products and servers. Although in the following embodiments of the invention, the battery module is used in a server as an illustration, however, the fixing structure of battery module disclosed by the present invention is not limited to this and can be also applied in desktop, laptop and other electronic devices with cache memory. Only elements directly associated with the present invention are demonstrated in the diagrams for the purpose of illustrating structure and features in simplicity.

Referring to FIG. 2, the fixing structure of battery module of the present invention is provided for fixing a battery module 4 to the electronic device 3. One surface of the electronic device 3 is formed with a first lid 31 and second lid 32, which is formed with a corresponding first fastening part 311 and a second fastening part 321 respectively. The inner part of the electronic device 3 corresponding to the second lid 32 has a mounting cavity 33 for accommodating the battery module 4. The second lid 32 has a first locking part 322 while the battery module 4 has a second locking part 41 corresponding to the first locking part 322 for fastening the second lid 32. Through fastening the first lid 31 with the second lid 32, the battery module 5 is fixed within the battery module mounting cavity 33 of the electronic device 3.

In this preferred embodiment, the electronic device 3 can be a server, which is covered by a first lid 31 for covering electronic components within the server such as a motherboard, CPU and heat dissipating fan (all not shown in the drawing). The mounting cavity 33 is a space preserved for hard disk and is covered by a second lid 32. The second lid 32 is mounted on one of two opposing sides of the mounting cavity 33 more distant from the first fastening part 311.

The first locking part 322 on the second lid 32 is a pillar and the second locking part 41 on the battery module 4 is a two connected openings, comprising the first opening 410 connecting with the first locking part 322 and second opening 411 for connecting with the first opening 410 so as to fix the second opening 411 of the first locking part 322 (pillar) in place. The first opening 410 of the second locking part 41 is knitted with the first locking part 322 (pillar) of the second lid 32, allowing the first locking part 322 (pillar) to be inserted into the first opening 410. Then the battery module 4 is horizontally moved to a place where the locking part 322 (pillar) is fixed with the second opening 411 in place. And the second lid 32 is closed and making sure that the battery module 4 is electrically connected to the inner part of the electronic device. Lastly, the first fastening part 311 of the first lid 31 is fastened with the second fastening part 321 of the second lid 32, so as to fix the battery module 4 within the electronic device 3.

Referring to FIG. 3 and FIG. 2, the electronic device 3 further comprises a protruding blade 35 extending to the mounting cavity, so as to make sure that the second opening 411 of the second locking part 41 is properly fixed with the first locking part 322 (pillar) by making sure that the protruding blade 35 touches the side of the battery module 4, otherwise the second lid 32 cannot be closed due to the hindrance of the protruding blade 35. Besides, the protruding blade 35 also prevents moving of the battery module 4 from the second lid 32 during shaking, moving of the electronic device 3.

The electronic device 3 further comprises step-like bumps 34 disposed on the two opposing sides of the mounting cavity 33, for fixing the second lid 32 in place, allowing the second lid 32 when covers the mounting cavity 33 to be flush with the case of adjacent electronic device 3, so as to and make the second lid 32 to be fixed to a position where the second fastening part 321 is fastened with the first fastening part 311.

Referring to FIG. 4, the first fasting part 311 can be a slot on the underneath surface of the first lid 31 while the second fastening part 321 can be a bolt 3211 corresponding to the slot or a bullet flip 3212 that links up with the lower surface of the first lid 31. The electronic device 3 further comprises a third fastening part, which is fastened with the first fastening part 311. It should be noticed that the fastening method is not limited to the first fastening part 311, second fastening part 321 and third fastening 36 described in this embodiment. However, the various types of fastenings methods are well known in the art so will not be illustrated here.

Comparing with the complication using screws to fix the battery module, the fixing structure of battery module proposed by the present invention can fix the battery module in the electronic device without the need of using tools, allowing assembling and disassembling of battery module in an electronic device to be easier and quicker compared to the prior art.

Moreover, in order to solve the problem of lack of enough space for accommodating so many electronic components in an electronic device, in the present invention, the battery module is mounted in a space where the hard disk is installed and a lid is provided to fix and cover the battery module, instead of installing the battery module in the area where mother board, heat dissipating fan, and a plurality of circuit pattern are disposed under the upper lid of the server. As such, the battery module can be used in a server where the space is limited.

Furthermore, the fixing structure of the battery module proposed by the invention fixes the battery module in the electronic device by fastening the firs lid with the second lid through forming a fastening part on the second lid to fasten with the first lid, closing the second lid and forming locking structures on the battery module, thereby desirably reducing the cost.

In summary, the fixing structure of the battery module provided by the present speeds up the process of assembling and dissembling of battery module without the need of using tools, as well as reducing the cost, thereby having high value in industry.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fixing structure of battery module, for fixing a battery module in an electronic device, the fixing structure comprising:
   a first lid and a second lid, which are formed on a surface of the electronic device, wherein the first lid is formed with a first fastening part, and the second lid is formed with a second fastening part for being engaged with the first fastening part so as to couple the second lid to the first lid;
   a mounting cavity formed in the electronic device at a position corresponding to the second lid;
   a first locking part formed on the second lid; and
   a second locking part formed on the battery module, for being coupled to the first locking part so as to fasten the battery module to the second lid, such that with the first and second lids being coupled together by the first and second fastening parts, the mounting cavity is covered by the second lid, and the battery module fastened to the second lid is received in the mounting cavity and fixed in the electronic device,
   wherein the first fastening part is a slot formed on a lower surface of the first lid, and the second fastening part comprises a bolt corresponding to the slot and a bullet flip for abutting against the lower surface of the first lid.

2. The fixing structure of battery module of claim 1, wherein the electronic device is selected from the group consisting of a server, desktop computer, laptop computer and portable electronic product.

3. The fixing structure of battery module of claim 1, wherein the second lid is pivoted on one of two opposing sides of the mounting cavity more distant from the first fastening part.

4. The fixing structure of the battery module of claim 3, further comprising step-shaped bumps formed on the two opposing sides of the mounting cavity, for fixing the second lid to a position where the second fastening part is engaged with the first fastening part.

5. The fixing structure of battery module of claim 3, further comprising step-shaped bumps formed on the two opposing sides of the mounting cavity, for positioning the second lid in place and making the second lid cover the mounting cavity and flush with an adjacent case of the electronic device.

6. The fixing structure of battery module of claim 1, further comprising a third fastening part formed on the surface of the electronic device at a position corresponding to the first fastening part, so as to allow both the third and second fastening parts to be engaged with the first fastening part.

7. The fixing structure of battery module of claim 1, wherein the first lid is a top lid of the electronic device for covering electronic components including motherboard, CPU and heat dissipating fan, and the mounting cavity is an area preserved for a hard disk of the electronic device.

8. A fixing structure of battery module, for fixing a battery module in an electronic device, the fixing structure comprising:
   a first lid and a second lid, which are formed on a surface of the electronic device, wherein the first lid is formed with a first fastening part, and the second lid is formed with a second fastening part for being engaged with the first fastening part so as to couple the second lid to the first lid;
   a mounting cavity formed in the electronic device at a position corresponding to the second lid
   a first locking part formed on the second lid; and
   a second locking part formed on the battery module, for being coupled to the first locking part so as to fasten the battery module to the second lid, such that with the first and second lids being coupled together by the first and second fastening parts, the mounting cavity is covered by the second lid, and the battery module fastened to the second lid is received in the mounting cavity and fixed in the electronic device,
   wherein the first locking part of the second lid is a pillar and the second locking part of the battery module comprises two connected openings comprising a first opening for accommodating the first locking part and a second opening connected with the first opening and for fixing the first locking part.

9. The fixing structure of battery module of claim 8, further comprising a protruding blade extending into the mounting cavity, for confirming that the pillar has been positioned in the second opening of the second locking part if the protruding blade touches a side of the battery module.

* * * * *